(12) United States Patent
Stacey

(10) Patent No.: US 10,922,272 B2
(45) Date of Patent: Feb. 16, 2021

(54) PROVIDING DATA ACROSS MULTIPLE CLUSTERS IN A SINGLE NAMESPACE

(71) Applicant: EMC IP Holding Company LLC, Hopkinton, MA (US)

(72) Inventor: Chris Stacey, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 89 days.

(21) Appl. No.: 16/259,251

(22) Filed: Jan. 28, 2019

(65) Prior Publication Data

US 2020/0242076 A1    Jul. 30, 2020

(51) Int. Cl.
| | | |
|---|---|---|
| *G06F 16/13* | (2019.01) | |
| *G06F 16/182* | (2019.01) | |
| *G06F 21/60* | (2013.01) | |
| *H04L 29/08* | (2006.01) | |
| *G06F 16/25* | (2019.01) | |
| *G06F 16/28* | (2019.01) | |

(52) U.S. Cl.
CPC ............ *G06F 16/13* (2019.01); *G06F 16/183* (2019.01); *G06F 16/256* (2019.01); *G06F 16/282* (2019.01); *G06F 21/604* (2013.01); *H04L 67/1008* (2013.01); *H04L 67/1097* (2013.01); *H04L 67/2814* (2013.01)

(58) Field of Classification Search
CPC ...... G06F 16/13; G06F 16/183; G06F 16/256; G06F 16/282; G06F 21/604; H04L 67/1008; H04L 67/2814
USPC ........................................................ 707/781
See application file for complete search history.

(56) References Cited

U.S. PATENT DOCUMENTS

| | | | | |
|---|---|---|---|---|
| 8,176,012 B1 * | 5/2012 | Rabii | ................... | G06F 16/184 707/655 |
| 8,516,149 B1 | 8/2013 | Stacey | | |
| 2010/0114889 A1 * | 5/2010 | Rabii | ................. | G06F 16/1824 707/737 |
| 2012/0254111 A1 * | 10/2012 | Carmichael | ........... | G06F 16/134 707/627 |
| 2015/0074168 A1 * | 3/2015 | Hartman | ............... | G06F 16/182 709/201 |

OTHER PUBLICATIONS docs.microsoft.com, "[MS-DFSC]: Distributed File System (DFS): Referral Protocol," Feb. 14, 2019, https://msdn.microsoft.com/en-us/library/cc226982.aspx, 2 pages.

Shepler, et al., "Network File System (NFS) Version 4 Minor Version 1 Protocol," Internet Engineering Task Force (IETF), Request for Comments: 5661, Category: Standards Track, ISSN: 2070-1721, Jan. 2010, 617 pages.

* cited by examiner

*Primary Examiner* — Dung K Chau

(74) *Attorney, Agent, or Firm* — Amin, Turocy & Watson, LLP

(57) ABSTRACT

Techniques are provided for providing data across multiple clusters in a single namespace. In an example, a first cluster can comprise an accelerator node that communicates with a client computer, and is configured both to refer the client computer to another cluster, and to proxy data from another cluster to the client. When the client computer accesses data at a junction in the namespace between the first cluster and a second cluster, the accelerator node can determine whether to refer the client computer or proxy the client computer. Then, the accelerator node can use this determined approach so that the client computer can access data from the second cluster.

20 Claims, 11 Drawing Sheets

PROVIDING DATA ACROSS MULTIPLE CLUSTERS IN A SINGLE NAMESPACE

TECHNICAL FIELD

The present application relates generally to techniques for providing data to a computer across a communications network, and more specifically, to providing data stored across multiple computing clusters using a single namespace to a computer.

BACKGROUND

A distributed storage system generally is a form of computer data storage that can provide remote data storage and access to one or more client computers. In some embodiments, a distributed storage system can comprise one or more clusters, where a cluster comprises one or more nodes unified into a single shared computing and data storage resource.

BRIEF DESCRIPTION OF THE DRAWINGS

Numerous aspects, embodiments, objects, and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
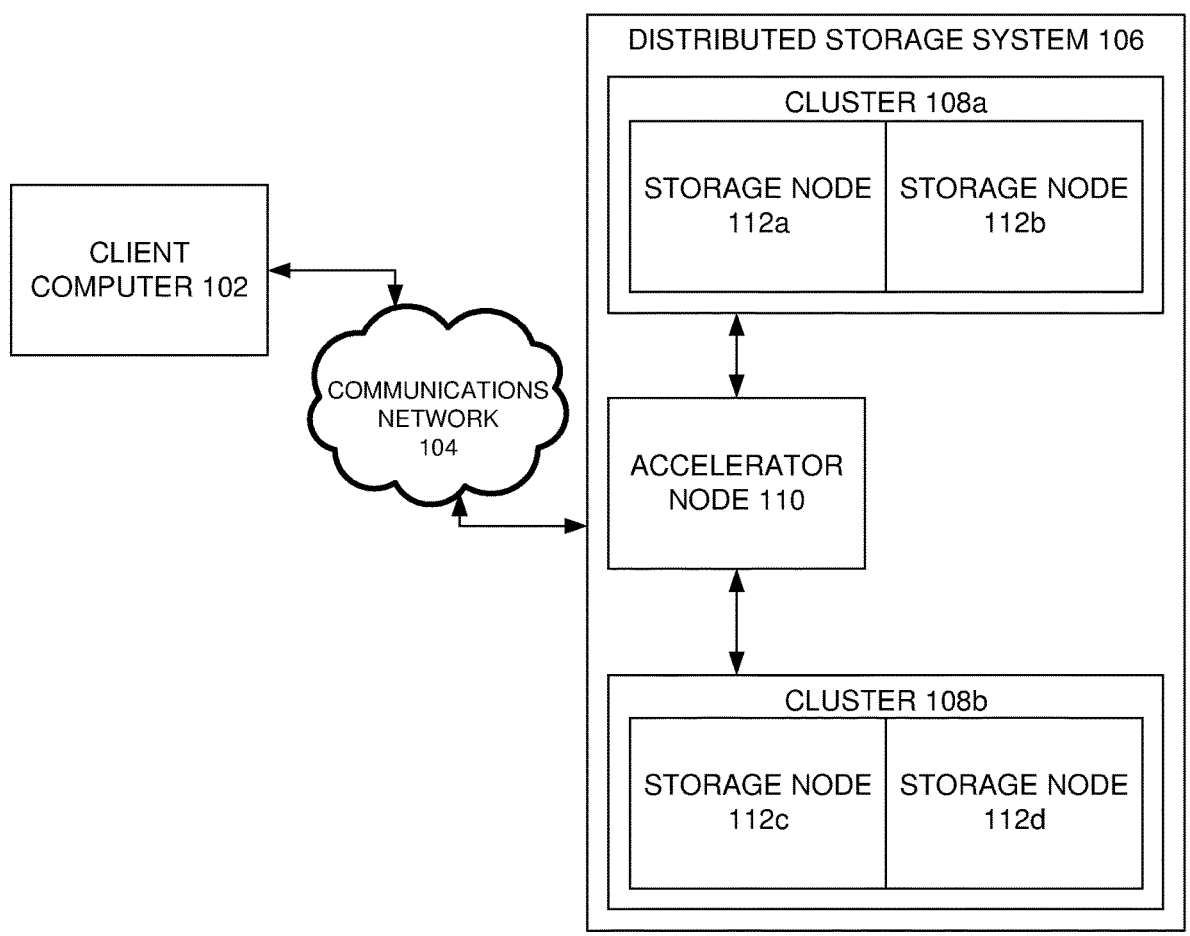
FIG. 1 illustrates a block diagram of an example system that can facilitate providing data across multiple clusters in a single namespace, in accordance with certain embodiments of this disclosure.

The present disclosure generally describes embodiments where the distributed storage system can be a Dell EMC Isilon Cluster distributed storage system, and the file system can be a Dell EMC Installable File System (IFS). It can be appreciated that there are other embodiments that utilize different technologies than described herein.

As described herein, a distributed storage system comprise one or more computing clusters (sometimes referred to as a cluster or a storage cluster). A computing cluster can then comprise one or more computing nodes (sometimes referred to as nodes or storage nodes). A computing cluster (and its computing nodes) can comprise one or more computing resources unified into a single shared computing resource. This shared computing resource can comprise a file system namespace (sometimes referred to as a namespace), which can be a way to identify one or more files. Within a namespace, it can be that a particular file name is unique, whereas that file name can be reused across multiple namespaces. An example of a namespace can be a directory of a file system in which files can be stored.

While a storage cluster can generally scale, there can be circumstances where there is a desire for a single, high-speed unstructured data namespace that is larger than the storage provided by one storage cluster. An approach to address this desire can be to rewrite a client application so that a client application does not attempt to access an amount of storage within one namespace that is larger than is provided by a storage cluster.

Another approach to address this desire can be to federate multiple storage systems together. There can be multiple approaches for federating multiple storage systems together, which can include referral-based approaches, and proxy-based approaches. Each of a referral-only-based approach and a proxy-only-based approach can have problems.

There are problems with referral-based federated storage systems. Referral-based federated storage systems include Windows Distributed File System (Windows DFS), and NFSv4 FedFS. A problem with these referral-based federated storage solutions is that they rely on clients using data access protocols that include referral support. That is, these referral-based protocols require a client to be configured to make a new connection to a different storage system, upon direction by the storage server (this different storage server is typically the server that houses the data that the client is attempting to access). Where the client is not connected via a protocol that supports referral, or is otherwise not configured to process a referral, then these referral-based approaches cannot be used.

There are also problems with proxy-based federation solutions. Such proxy-based federation storage solutions include a CacheFS functionality in Solaris and Linux operating systems, Avere, and NetApp Ontap cluster mode. A problem with these proxy-based federated storage solutions is that they introduce an additional hop in the data path between the client and the data storage location. This additional hop can be eliminated in some examples in accordance with the present techniques because an accelerator node participates in the storage network of each storage cluster, so can access data on behalf of clients in the same way as the storage nodes do. That is, the data path can be the same regardless of whether a client is connected to a storage cluster node or to an accelerator node.

A solution to problems of a referral-only-based approach or a proxy-only-based approach can be to combine a referral-based approach with a proxy-based approach in way that can mitigate against a problem of each approach. Examples that combine referral-based approaches and proxy-based approaches can utilize accelerator nodes.

A cluster that supports a multi-cluster federated namespace can comprise an accelerator node. In some examples, an accelerator node can participate as a "lightweight" member of each cluster in a particular federation. In some examples, an accelerator node does not contribute storage or participate in individual cluster operations, such as cluster quorum or lock management operations. An accelerator node can participate as an initiator node (i.e., read and write data) in each cluster in that an accelerator node can terminate client protocol connections via a frontend client network and provide read and write access to data stored on the storage clusters via the storage cluster's storage network.

Since an accelerator node can connect to, and therefore access data, via each storage cluster's storage network means that, in some examples, the performance of client access to data is the same whether access is via an accelerator node or via a storage node. The ability to provide access to the data stored in a storage cluster via an accelerator node's lightweight participation in that cluster allows for adding accelerator nodes to one or more storage clusters to scale the performance of data access independent of the storage capacity without compromising a resiliency of the storage clusters. In an example, to combine the file system namespaces of each storage cluster into a single federated namespace, each accelerator node can present an aggregation of the Access Zones (i.e., file server identities and data access protocol endpoints (e.g., Server Message Block (SMB) shares and NFS exports)) from each participant storage cluster. In some examples, this approach can provide redundancy and avoid creating a performance bottleneck for frontend client traffic as the entire federation of storage clusters can be accessible via any accelerator node.

A junction point can be enhanced to detect if an accelerator node or a traditional storage node has access to the target of the junction via either backend storage, or a frontend client network. If so, the accelerator node can decide whether to refer the client to the target cluster, or proxy the data traffic on behalf of the client. In some examples, an accelerator node can base this refer-or-proxy decision on one or more of several factors: storage administrator preference, client protocol support for referral (e.g., SMBv2, SMBv3, NFSv4, S3 v. NFSv3, Hadoop File System (HDFS), and File Transfer Protocol (FTP)); backend or frontend network accessibility; accelerator node and/or target cluster node; and user, group, application, data set, and quality of service rules.

In some examples, an approach that allows for both accelerator nodes and traditional storage nodes to proxy or refer client traffic means that junctions can exist anywhere in a file system namespace of an entire federation without restricting clients to connecting only to accelerator nodes. This also can mean that client transitions through junctions can be as efficient as possible (i.e., a single hop), rather than having to be directed to an accelerator node first, and then to a desired target location.

In some examples, storage clusters share a common backend, or storage network. In other examples, storage clusters do not share a common backend, or storage network. In some examples, client computers can connect to a storage cluster via a Network Attached Storage (NAS) protocol, and at a frontend or client network. That is, nodes of a storage cluster can communicate amongst themselves via one computing network (a backend network) and communicate with client computers via another computing network (a frontend network).

A storage cluster can be configured to have a junction point capability. A single file system namespace can be created by federating, or stitching together, multiple individual file sets hosted by multiple file servers. A file set can comprise a file system, or a portion of a file system. Federating these file sets can be done at junctions. A junction in one file set can be represented like a normal directory, but in effect be a pointer to another file set that is hosted by the same file server, or a different file server. In some examples, a junction does not store a location of a target file set. Rather, in such examples, a junction can store a unique identifier of the file set to which it refers. This unique identifier can be referred to as a file set identifier, or a File Set Name (FSN).

A junction can also store a fully qualified domain name (FQDN) of a system of a Lightweight Directory Access Protocol (LDAP) directory that can be used to resolve a FSN to its current location (i.e., the FQDN and export of the file set on a file server). A namespace database used in this approach can be referred to as a Namespace Database (NSDB), and the location of its file set can be referred to as its File Set Location (FSL). In some examples, there can be multiple FSL entries associated with one FSN in a NSDB.

In some examples, when a user of an application (such as a Network File System version 4 (NFSv4 client) attempts to navigate into or through a junction in a namespace, the file server hosting the file system in which the junction resides can extract the FSN and relevant NSDB information from the junction. Then, the file server can contact the NSDB to look up the. Current FSL (or FSLs) for the file set. The file server can respond to the client with either a referral or a proxy.

In a referral (which can be a NFSv4 referral), the file server can respond to a client with Request for Comment (RFC) 3530 and RFC 5661 fs_locations or fs_locations_info information, which can include all or a subset of the FSLs for the file set in question. In a SMB context, a referral can be effectuated with a Distributed File System (DFS) Redirect. The client can then make a connection to the target file server so that the user or application can continue browsing what appears to the client as a single file system namespace.

Example Architectures

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

FIG. 1 illustrates a block diagram of an example system 100 that can facilitate providing data across multiple clusters in a single namespace, in accordance with certain embodiments of this disclosure. System 100 comprises client computer 102, communications network 104, and distributed storage system 106. In turn, distributed storage system 106 comprises cluster 108a, cluster 108b, and accelerator node 110. Cluster 108a storage node 112a and storage node 112b. Cluster 108b comprises storage node 112c and storage node 112d.

It can be appreciated that there can be clusters that comprise more (or fewer) than two storage nodes. Additionally, it can be appreciated that there can be distributed storage systems that comprise more than one accelerator node. Furthermore, in some example distributed storage systems that comprise multiple accelerator nodes, different accelerator nodes can provide access to different resources and different namespaces.

Figure 10:
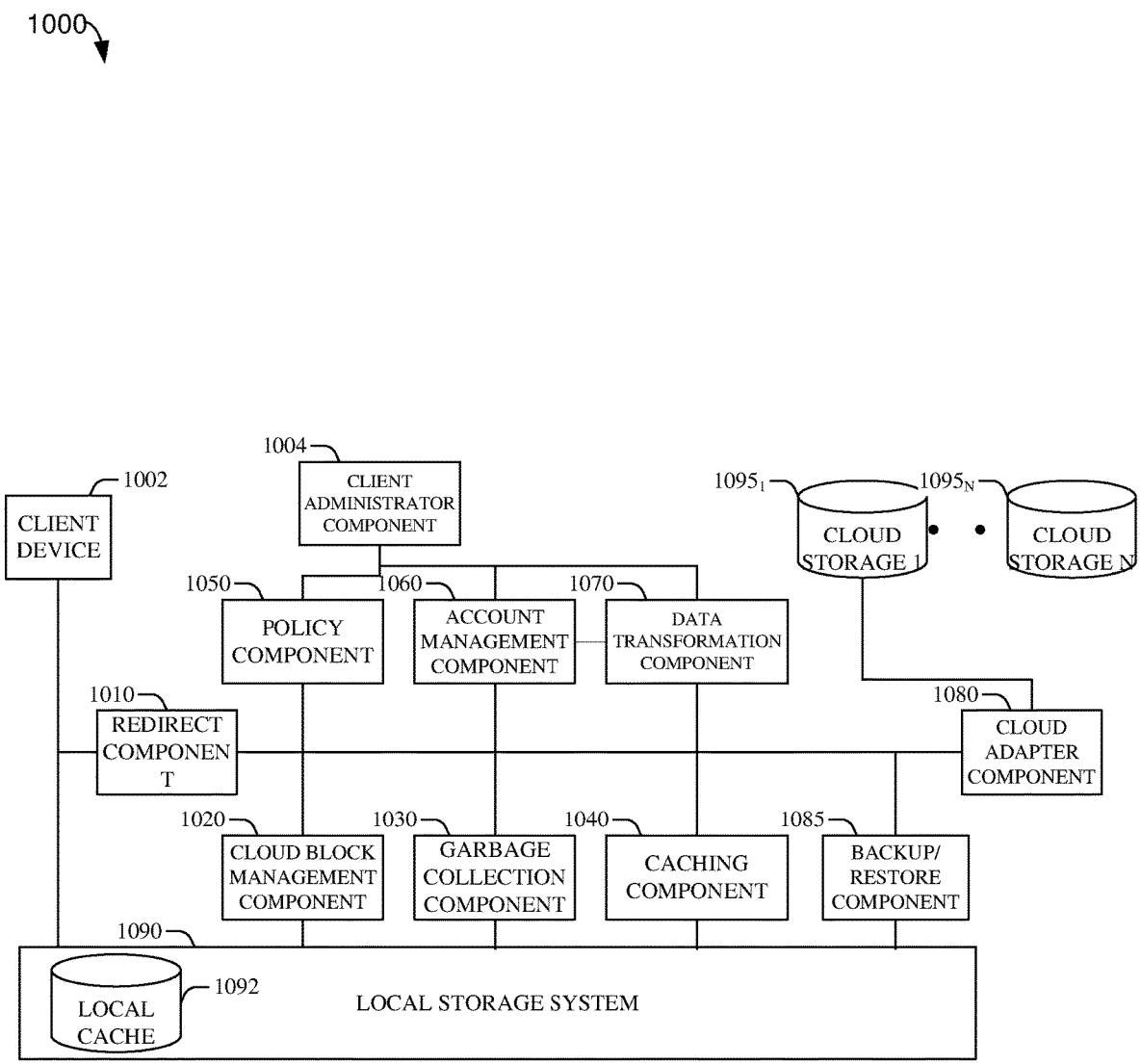
FIG. 10 illustrates a block diagram of an example distributed file storage system that employs tiered cloud storage in accordance with certain embodiments of this disclosure.
Figure 11:
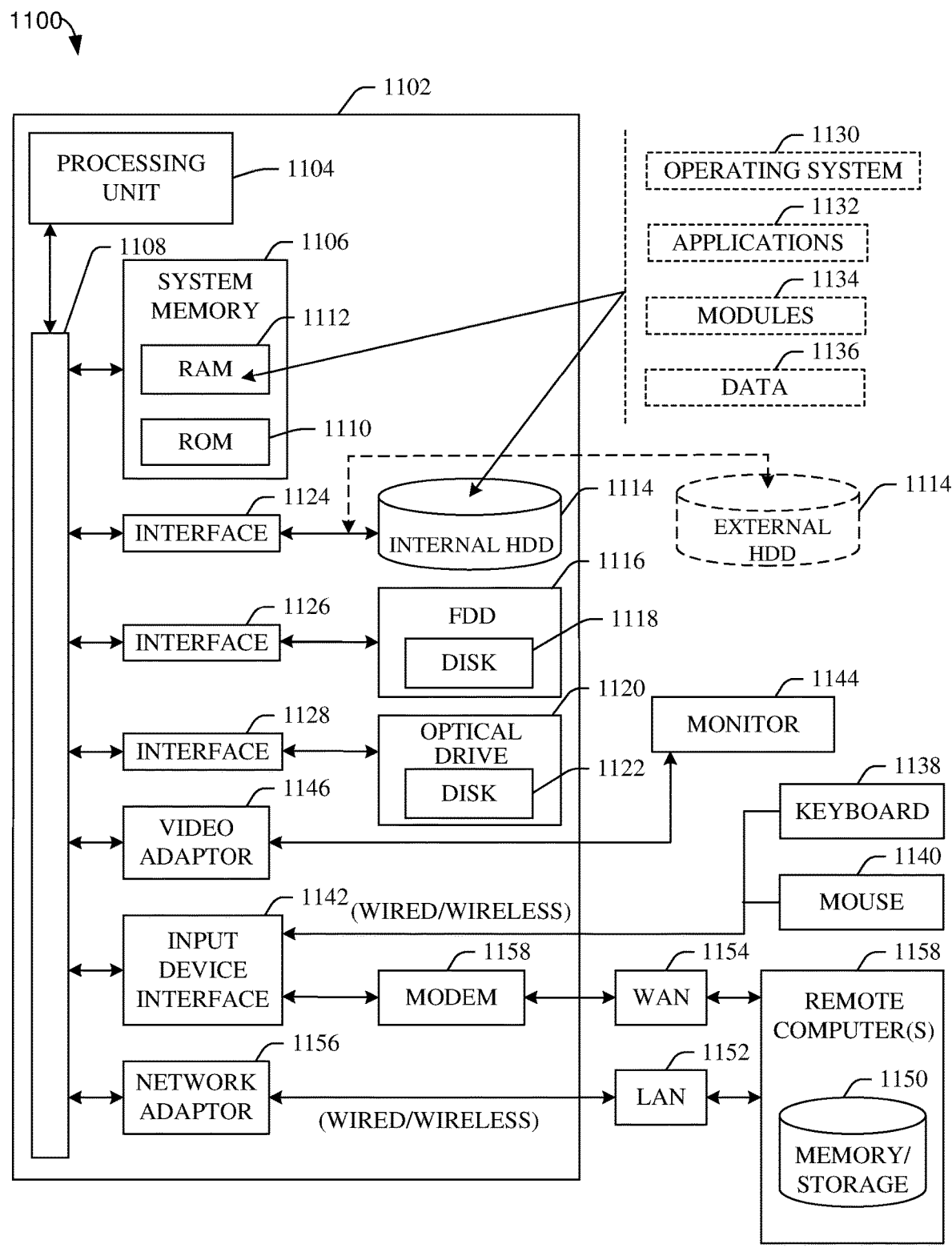
FIG. 11 illustrates an example block diagram of a computer operable to execute certain embodiments of this disclosure.

In some examples, aspects of distributed storage system 1000 of FIG. 10 and computer 1102 of FIG. 11 can be used to implement cluster 108a and cluster 108b of FIG. 1, and aspects of computer 1102 can be used to implement client computer 1012, distributed storage system 106, accelerator node 110, and storage node 112 of FIG. 1.

Client 102 can communicate with distributed storage system 106 via communications network 104. In some examples, communications network 104 can be considered to be a frontend network of distributed storage system 106, because an external client (client 102) can access the distributed storage system via this communications network. A frontend network can be viewed in contrast to a backend network, such as communications network 212 of FIG. 2. As depicted, client 102 can access both cluster 108a and cluster 108b of distributed storage system 106 via communications network 104.

In this communication, client 102 can access data stored in distributed storage system 106, such as data stored by storage node 112. Where client 102 communicates with cluster 108a or client 108b, client 102 can communicate with accelerator node 110, which can be a member of both cluster 108a and cluster 108b.

Accelerator node 110 can comprise a computing device that can perform various operations. Accelerator node 110 can terminate client protocol connections from communications network 104 in each cluster in which it is a member, and provide read and write access to data stored. Accelerator node 110 can connect to cluster 108a via a storage network of cluster 108a, and connect to cluster 108b via a storage network of cluster 108b.

In an example, to combine a file system namespace of cluster 108a and a file system namespace of cluster 108b, accelerator node 110 can present an aggregation of Access Zones of cluster 108a and cluster 108b. In other words, accelerator node 110 can present client 102 with data across the multiple clusters of cluster 108a and cluster 108b in a single namespace.

As depicted, client 102 can directly reach both cluster 108a and cluster 108b via communications network 104. This connectivity is represented by the arrow between communications network 104 and distributed storage system 106 (as opposed to something within distributed storage system, like a single cluster) to indicate that the connectivity is to each cluster within distributed storage system 106. Since client 102 can directly reach both cluster 108a and cluster 108b, when client 102 reaches a junction in the namespace between data stored in cluster 108a and data stored in cluster 108b, accelerator node 110 can determine whether to proxy the data to client 102, or to refer client 102 to another cluster. In some examples where a client lacks the ability to access a particular cluster via a frontend network, an accelerator node may then lack the option of referring the client to that particular cluster, and instead can proxy data between that particular cluster and the client.

In some examples, a junction can comprise information about another storage cluster that houses target data. A junction can be implemented in a manner similar to a soft link (e.g., a pointer to another location) or a mount point (e.g., navigating to/home in a file system can be a mount point that mounts another file storage server). To a client, a junction can appear in a file system as a directory to navigate into. Then a junction can be a point from one physical location to another. In some examples, a client can be configured to recognize that a junction references a new location, and to navigate to that new location.

Figure 2:
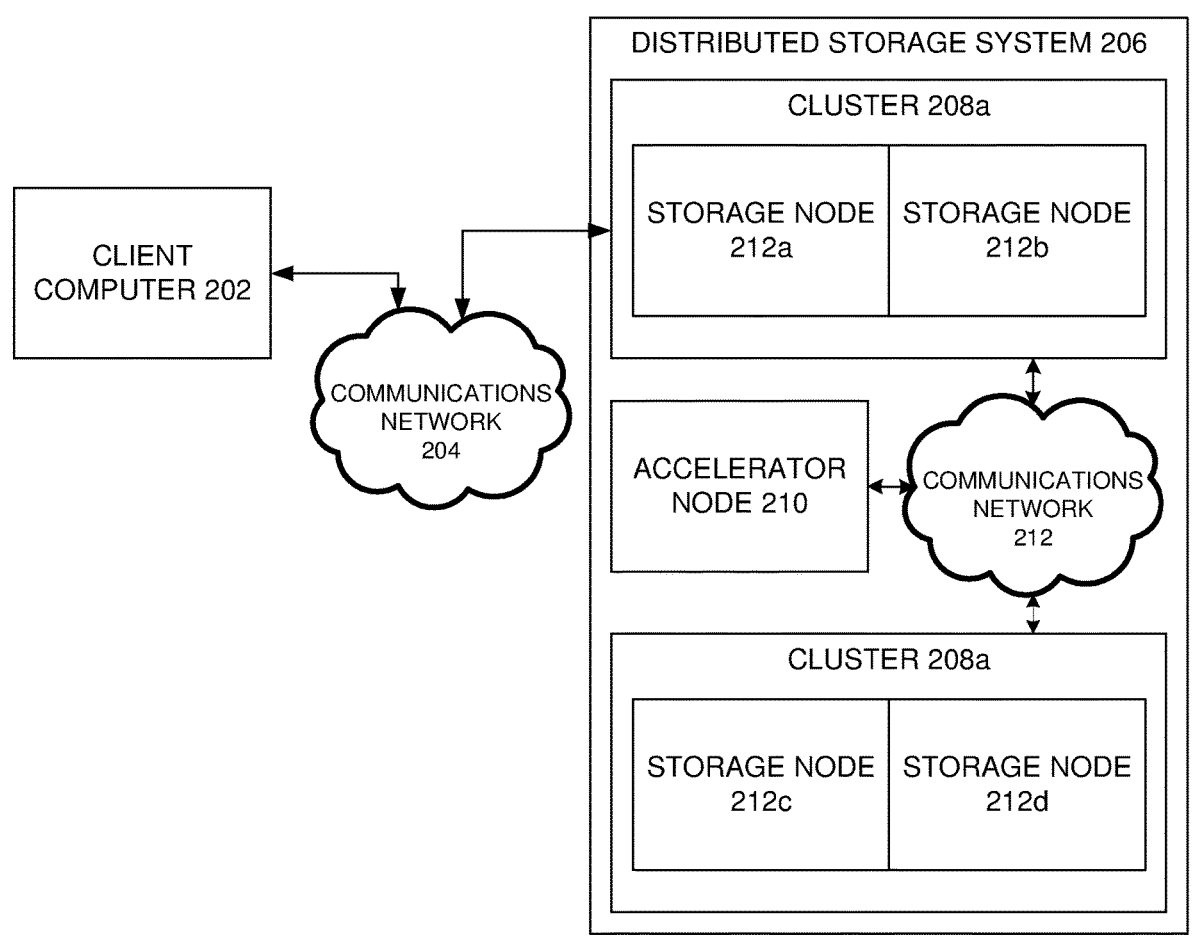
FIG. 2 illustrates a block diagram of another example system that can facilitate providing data across multiple clusters in a single namespace, in accordance with certain embodiments of this disclosure.

FIG. 2 illustrates a block diagram of another example system 200 that can facilitate providing data across multiple clusters in a single namespace, in accordance with certain embodiments of this disclosure. System 200 comprises client computer 202, communications network 204, and distributed storage system 206. In turn, distributed storage system 206 comprises cluster 208a, cluster 208b, accelerator node 210 and communications network 212. Cluster 208a comprises and storage node 212a and storage node 212b. Cluster 208b comprises storage node 212c and storage node 212d.

In some examples, client 202 can be similar to client 102 of FIG. 1; communications network 204 can be similar to communications network 104; distributed storage system 206 can be similar to aspects of distributed storage system 106; cluster 208a and cluster 208b can be similar to aspects of cluster 108a and cluster 108b, respectively; accelerator node 210 can be similar to accelerator node 110; and storage node 212a, storage node 212b, storage node 212c, and storage node 212d can be similar to storage node 112a, storage node 112b, storage node 112c, and storage node 112d, respectively.

In the example of system 200, client 202 can reach cluster 208a via communications network 204 (which can be referred to as a frontend network), but client 202 is not configured to reach cluster 208b via communications network 204. An example of why client 202 is not configured to reach cluster 208b via communications network 204 can be that cluster 208b is not connected to communications network 204.

Take an example where client 202 communicates with accelerator node 210 to access data in cluster 208a (that is stored in storage node 212a and/or storage node 212b). When client 202 reaches a junction in the data that leads to data stored in cluster 208b, accelerator node 210 can determine that client 202 is unable to be referred to cluster 208b because client 202 cannot access cluster 208b via communications network 204. So, lacking the option to refer client 202 to cluster 208b, accelerator node can determine instead to proxy data between client 202 and cluster 208b.

Figure 3:
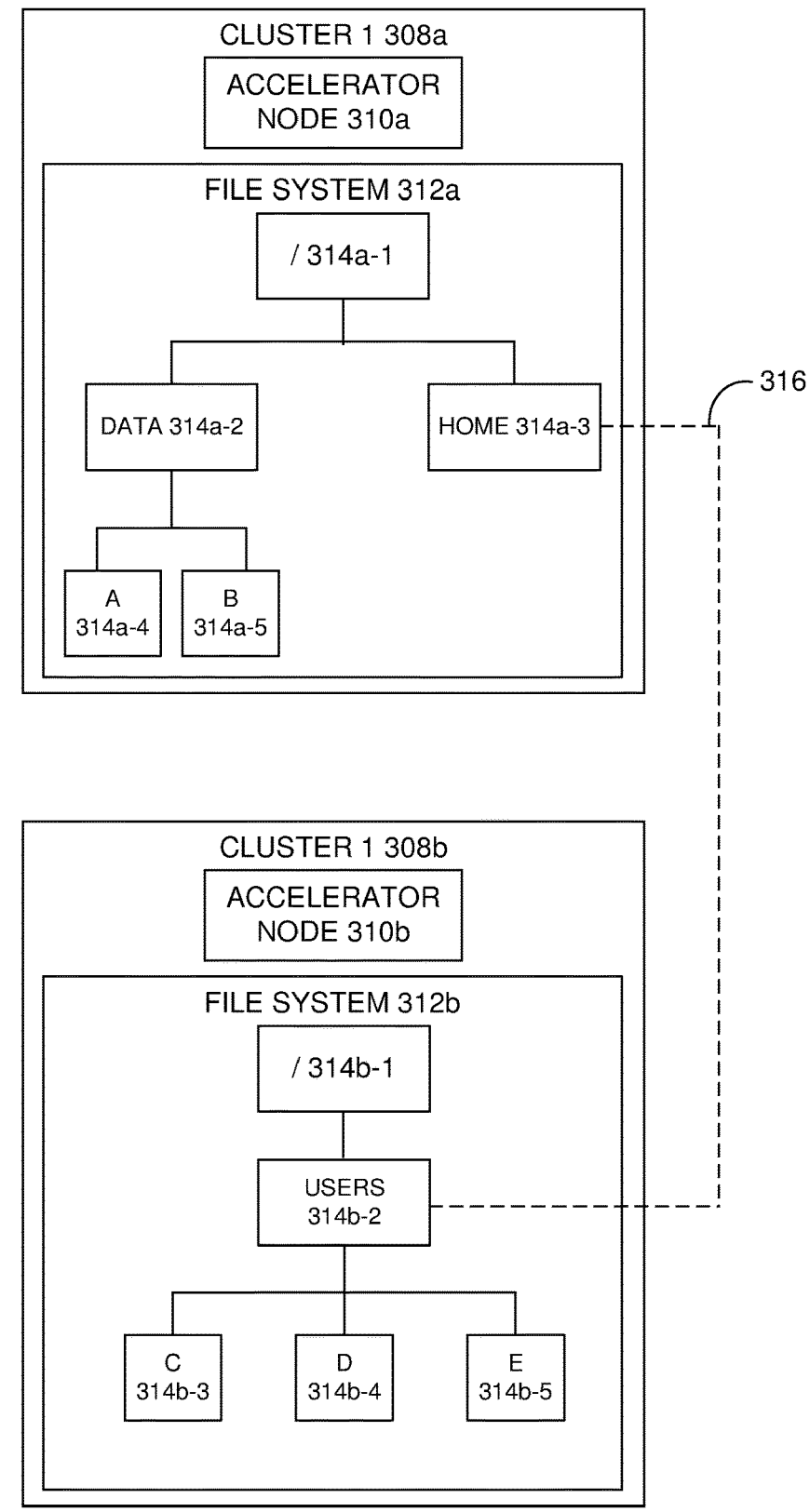
FIG. 3 illustrates a diagram of an example federated file system namespace with a junction that is stored across multiple clusters, in accordance with certain embodiments of this disclosure

FIG. 3 illustrates a diagram of an example federated file system namespace 300 with a junction that is stored across multiple clusters, in accordance with certain embodiments of this disclosure. Federated file system namespace 300 comprises cluster 1 308a, cluster 2 308b, and junction 316. Cluster 1 308a comprises accelerator node 310a and file system 312a. File system 312a comprises directory 314a-1, directory 314a-2, and directory 314a-3, directory 314a-4 and directory 314a-5.

Similar to cluster 1 308a, cluster 2 308b comprises accelerator node 310b and file system 312b. File system 312b comprises directory 314b-1, directory 314b-2, and directory 314b-3, directory 314b-4 and directory 314b-5.

In some examples, each of cluster 308a and 308b can be similar to cluster 108a of FIG. 1, and each of accelerator node 310a and accelerator node 310b can be similar to accelerator node 110. While, in FIG. 3, accelerator node 310a and accelerator node 310b are depicted as being part of a respective cluster (cluster 308a and cluster 308b), it can be appreciated that an accelerator node can be a member of multiple clusters simultaneously. For instance, there can be examples where accelerator node 310a is a member of both cluster 308a and cluster 308b.

Junction 316 comprises a point at which two individual file sets hosted by different file servers can be federated, so as to represent a single. In some examples, a junction can be represented by a directory in a file system, which then points to another file set hosted on that same file server, or on a different file server. In some examples, a junction can store a location of a target file set, or a unique identifier of a file set, such as a FSN.

In federated file system namespace 300, junction 316 stitches together directory 314a-3 of file system 312a and directory 314b-2 of file system 312b, to present both file system 312a and file system 312b in a single namespace to a client. An example of how this federated namespace can be viewed by a client is shown in diagram 400 of FIG. 4.

Figure 4:
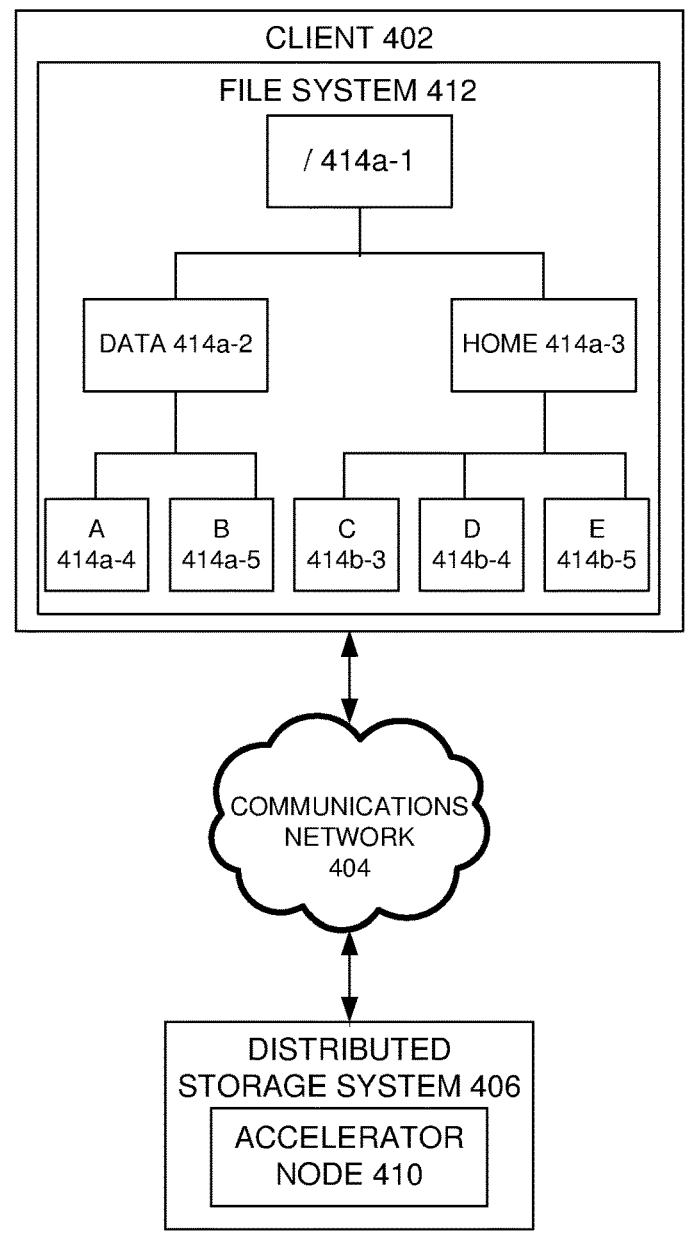
FIG. 4 illustrates a diagram of the example federated file system namespace of FIG. 3 as it can appear to a client computer, in accordance with certain embodiments of this disclosure

FIG. 4 illustrates a diagram 400 of the example federated file system namespace of FIG. 3 as it can appear to a client computer, in accordance with certain embodiments of this disclosure. Diagram 400 comprises client 402, communications network 404, and distributed storage system 406. Client comprises file system 412. Distributed storage system 408 comprises accelerator node 410.

Client 402 can be similar to client 102 of FIG. 1, communications network 404 can be similar to communications network 104, and distributed storage system 406 can be similar to distributed storage system 106.

Client 402 can communicate with accelerator node 410 via communications network 404. Accelerator node 410 can present client 402 with a federated namespace that combines file system 312a and file system 312b. This federated namespace that combines file system 312a and file system 312b can appear to client 402 as file system 412.

File system 412 comprises directory 414a-1, directory 414a-2, directory 414a-3, directory 414a-4, directory 414a-5, directory 414b-3, directory 414b-4, and directory 414b-5. Directory 414a-4, directory 414a-5, directory 414b-3, directory 414b-4, and directory 414b-5 can correspond to resources that are split across file system 312a and file system 312b-directory 314a-4 and directory 314a-5 on file system 312a, and directory 314b-3, directory 314b-4, and directory 314b-5 on file system 312b.

Figure 5:
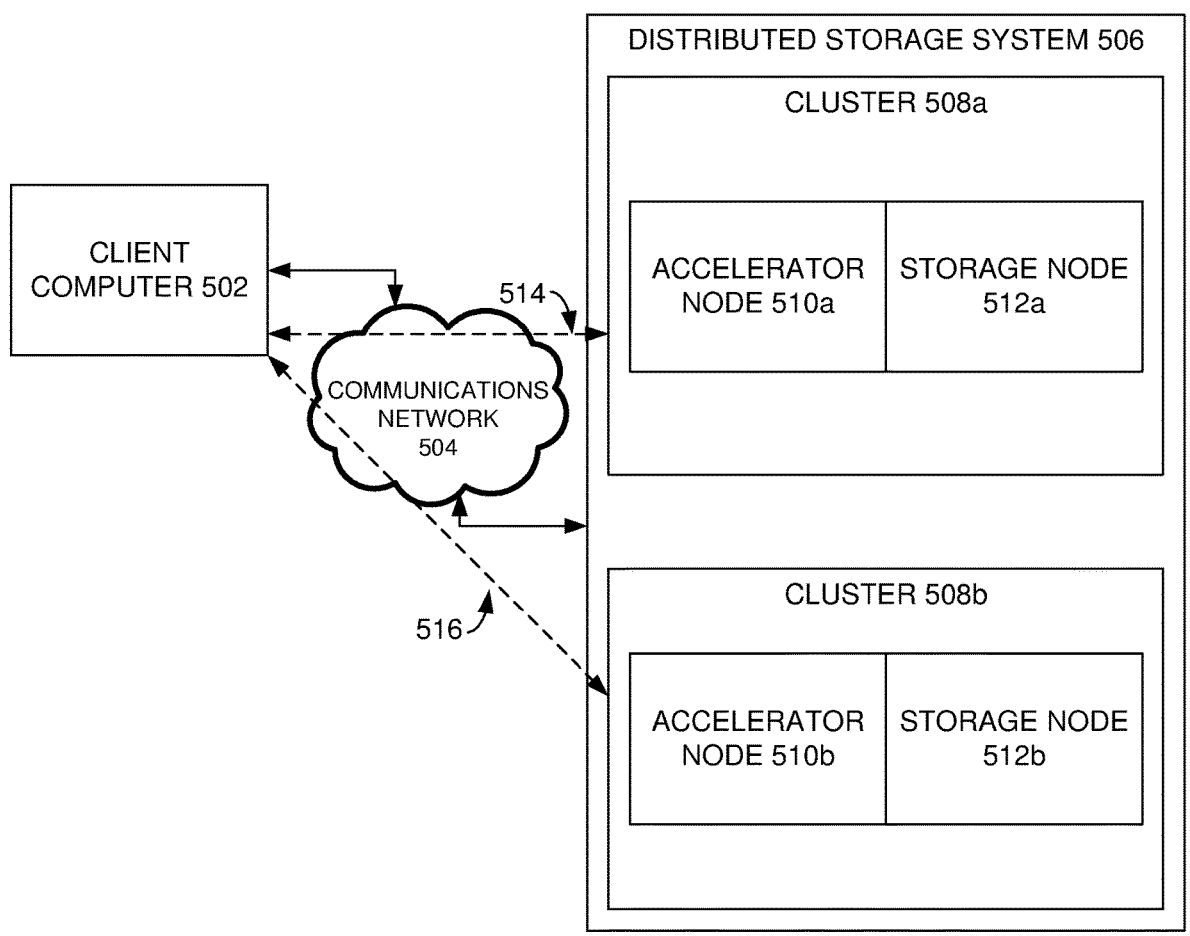
FIG. 5 illustrates a block diagram of an example system that can facilitate referring a client computer between multiple clusters, in accordance with certain embodiments of this disclosure.

FIG. 5 illustrates a block diagram of an example system 500 that can facilitate referring a client computer between multiple clusters, in accordance with certain embodiments of this disclosure. System 500 comprises client 502, communications network 504, and distributed storage system 506. Distributed storage system 506 comprises cluster 508a (which in turn comprises accelerator node 510a and storage node 512a), and cluster 508b (which in turn comprises accelerator node 510b and storage node 512b).

Client 502 can be similar to client 102 of FIG. 1; communications network 504 can be similar to communications network 104; distributed storage system 506 can be similar to distributed storage system 106; cluster 508a can be similar to cluster 108a; cluster 508b can be similar to cluster 108b; accelerator node 510a and accelerator node 510b can be similar to accelerator node 110; and storage node 512a and storage node 512b can be similar to storage node 112a.

System 500 also comprises communication link 514 and communication link 516. Communication link 516 can comprise a communication link between client 502 and cluster 508a via communication network 504. Communication link 516 can comprise a communication link between client 502 and cluster 508b via communication network 504. These two communication links—communication link 514 and communication link 516 can illustrate a communication flow where an accelerator node refers a client to another cluster (as opposed to proxying data between the client and this other cluster, as illustrated in FIG. 6).

In this example, client 502 can originally communicate via communication link 514 to access data stored in cluster 508a. When client 502 reaches a junction in a namespace (from data in cluster 508a to cluster 508b), accelerator node 510a can then either refer client 502 to cluster 508b (so client 502 can access data from cluster 508b), or proxy data between client 502 and cluster 508b. In this example of FIG. 5, accelerator node 510a determines to refer client 502. A reason for determining to refer a client (as opposed to proxying) can be to reduce a load on accelerator node 510a that would exist due to spending computing resources on proxying.

As depicted, communication link 516 is the result of accelerator node 510a referring client 502 to cluster 508b. Here, client 502 has received the referral information (which can include an indication of an address via which cluster 508b) can be reached, and has initiated communication link 516, which is separate from communication link 514, to directly access data from cluster 508b.

Figure 6:
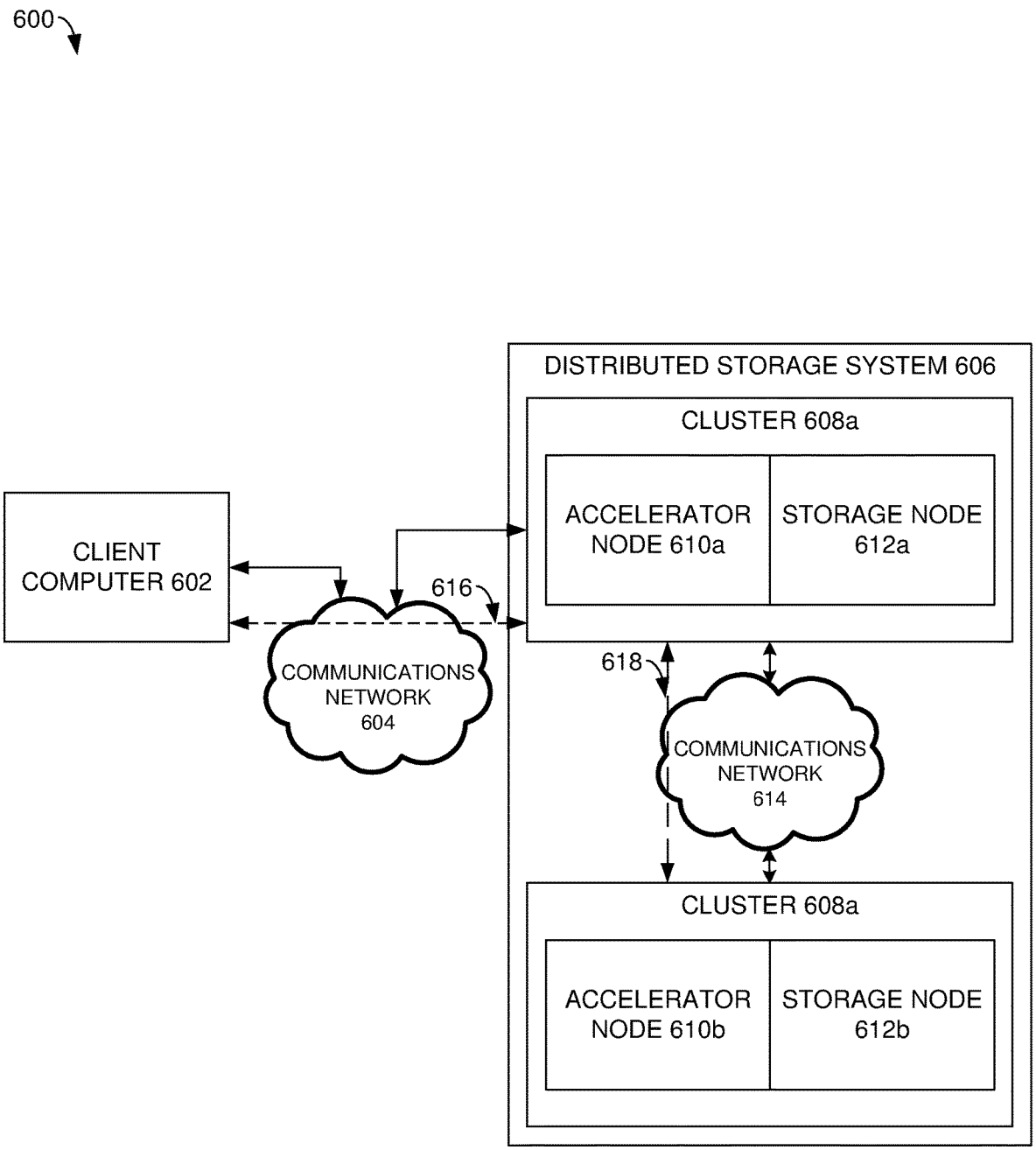
FIG. 6 illustrates a block diagram of an example system that can facilitate proxying data from a cluster to a client computer, in accordance with certain embodiments of this disclosure.

FIG. 6 illustrates a block diagram of an example system 600 that can facilitate proxying data from a cluster to a client computer, in accordance with certain embodiments of this disclosure. System 600 comprises client 602, communications network 604, and distributed storage system 606. Distributed storage system 606 comprises cluster 608a (which in turn comprises accelerator node 610a and storage node 612a), and cluster 608b (which in turn comprises accelerator node 610b and storage node 612b).

Client 602 can be similar to client 102 of FIG. 1; communications network 604 can be similar to communications network 104; distributed storage system 606 can be similar to distributed storage system 106; cluster 608a can be similar to cluster 108a; cluster 608b can be similar to cluster 108b; accelerator node 610a and accelerator node 610b can be similar to accelerator node 110; and storage node 612a and storage node 612b can be similar to storage node 112a.

System 600 also comprises communications network 614, communication link 616, and communication link 618. Communications network 614 can comprise a backend network that is similar to communications network 212 of FIG. 2. Communication link 616 can comprise a communication link between client 602 and cluster 608a via communication network 604. Communication link 618 can comprise a communication link between cluster 608a and cluster 608b via communication network 614. These two communication links—communication link 616 and communication link 618 can illustrate a communication flow where an accelerator node proxies data between a client and a cluster (as opposed to referring a client to a cluster, as illustrated in FIG. 5).

In this example, client 602 can originally communicate via communication link 616 to access data stored in cluster 608a. When client 602 reaches a junction in a namespace (from data in cluster 608a to cluster 608b), accelerator node 610a can then either refer client 602 to cluster 608b (so client 602 can access data from cluster 608b), or proxy data between client 602 and cluster 608b. In this example of FIG.

6, accelerator node 610*a* determines to proxy client 602. A reason for determining to proxy for a client (as opposed to referring) can be that the client is using a communications protocol that is configured to process refer information.

As depicted, communication link 618 (which can occur via communications network 614) is the result of accelerator node 610*a* proxying between client 602 and cluster 608*b*. Accelerator node 610*a* can receive data from client 602 on communication link 616 and send it to cluster 608*b* on communication link 618. Likewise, accelerator node 610*a* can receive data from cluster 608*b* on communication link 618 and send it to client 602 on communication link 616.

Example Process Flows

Figure 7:
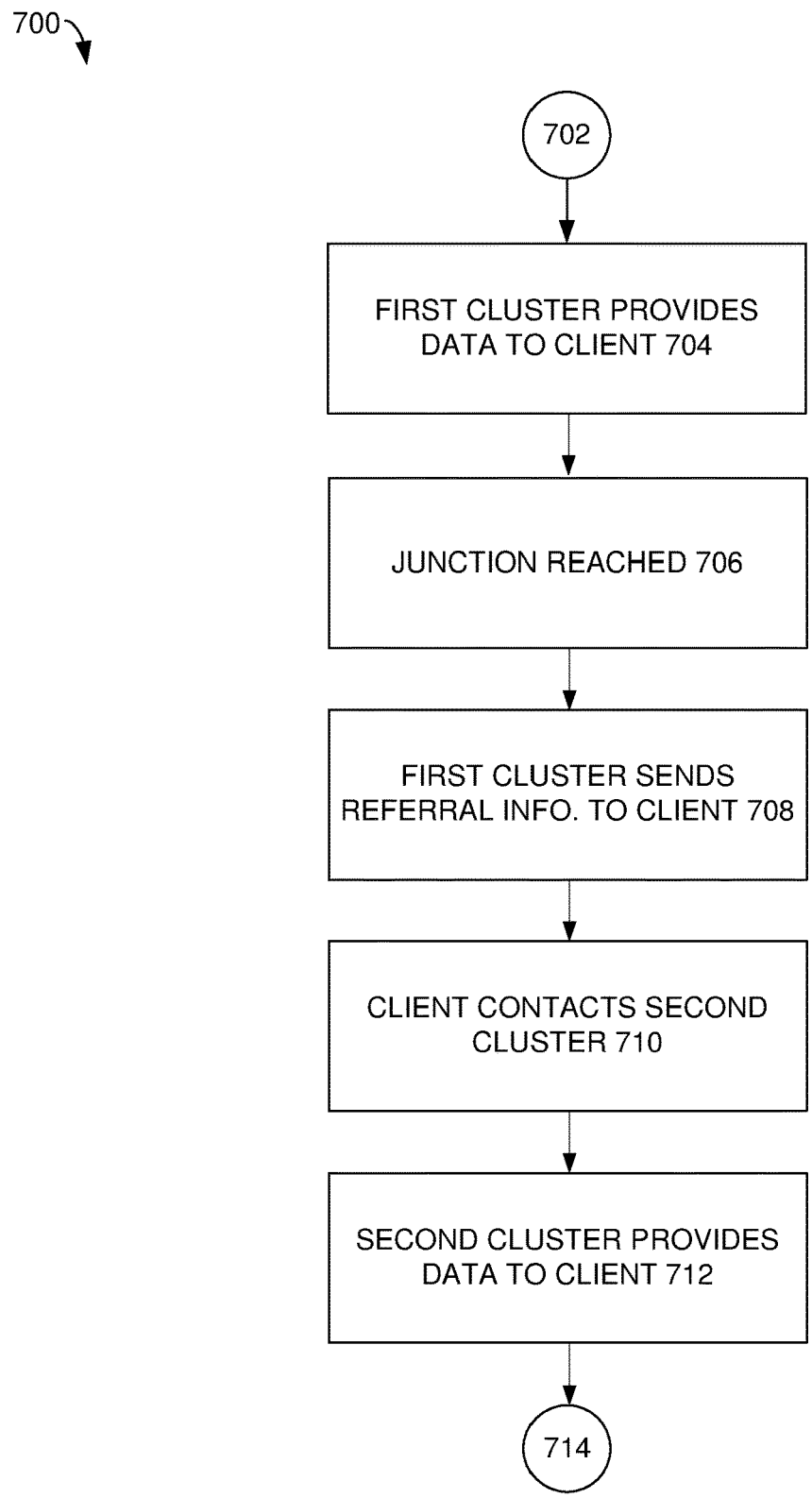
FIG. 7 illustrates an example process flow for referring a client computer between multiple clusters, in accordance with certain embodiments of this disclosure.

FIG. 7 illustrates an example process flow 700 for referring a client computer between multiple clusters, in accordance with certain embodiments of this disclosure. It can be appreciated that process flow 700 is an example process flow, and that there can be embodiments that implement more or fewer operations than are depicted in process flow 700, or that implement the operations of process flow 700 in a different order than is depicted in process flow 700.

In some embodiments, process flow 700 can be implemented with distributed storage system 106 of FIG. 1 as distributed storage system 106 provides data to client computer 102. Specifically, accelerator node 110 can interact with client computer 102 to effectuate process flow 700. Process flow 700 begins with 702, and then moves to operation 704.

Operation 704 depicts a first cluster providing data to a client computer. This can be data provided by a distributed storage system, such as a file in a file system that is read by the client. In other examples, the client can also write data to the distributed storage system, such as by creating or modifying a file of the distributed storage system.

In some examples, operation 704 can comprise providing, by a computing node that is a member of a first storage cluster and of a second storage cluster, first data in a first namespace to a first client computing device that is stored in the first storage cluster.

In some examples, the computing node is configured to serve as the proxy to the first client computing device, and is configured to refer the first client computing device to access the second storage cluster. That is, a computing node can determine whether to refer a client to another cluster, or to proxy data between another cluster and the client.

In some examples, the computing node is configured to participate as an initiator node for each of the first storage cluster and the second storage cluster, and to terminate a client protocol connection for each of the first storage cluster and the second storage cluster. The computing node can be an accelerator node as described herein, such as accelerator node 110 of FIG. 1 or accelerator node 210 of FIG. 2.

In some examples, the computing node presents the first namespace to the first client computing device by aggregating a first access zone of the first storage cluster and a second access zone of the second access cluster into the first namespace. That is, the computing node can present a single namespace that spans multiple clusters to a client.

After operation 704, process flow 700 moves to operation 706.

Operation 706 depicts determining that a junction has been reached. Determining that a junction has been reached can comprise determining that a client computer has navigated to a location in a file system where a junction is stored. In some examples, the junction comprises information about the second storage cluster. In some examples, the junction appears to the first client computing device as a directory in a file system of the first namespace.

After operation 706, process flow 700 moves to operation 708.

Operation 708 depicts the first cluster sending referral information to the client computer. This referral information can identify the second storage cluster to the client, and be used by the client to contact the second storage cluster to access the second storage cluster's data.

In some examples, operation 708 can comprise, in response to determining that a first client computing device is accessing first data in a first namespace at a junction between a first storage cluster and a second storage cluster, selecting an approach to provide access to the second storage cluster from a set of approaches, by a computing node, the set of approaches comprising serving as a proxy to the first client computing device to access second data that is stored in the second storage cluster, and referring the first client computing device to access the second storage cluster, wherein the selecting results in the selected approach.

In some examples, operation 708 can comprise, in response to determining that a second client computing device is accessing the second data at the junction, referring, by the computing node, the second client computing device to access the second storage cluster.

In some examples, operation 708 comprises providing or enabling the first client computing device to access to the second storage cluster, by the computing node, according to the selected approach to provide or enable access to the second storage cluster. That is, in some examples, the selected approach can comprise proxying or referring, and here referral information is provided to the client computing node to facilitate accessing data from the second storage cluster.

In some examples, operation 708 can comprise after providing, or facilitating the access by, the first client computing device access to the second storage cluster via referring the first client computing device access to the second storage cluster, switching, by the computing node, to provide, or facilitate the access by, the first client computing device access to the second storage cluster by proxying. That is, a client can be switched from referring to proxying. In some examples, transferring a client from referring to proxying can be effectuated by a service in a cluster to which the client has been referred. In such examples, the service can direct the client back to the computing node (which can be an accelerator node), and hence permit the computing node to make the proxy-or-refer decision again. This time, the computing node can select proxying for the client.

After operation 708, process flow 700 moves to operation 710.

Operation 710 depicts the client computer contacting the second cluster. In some examples, this can comprise the client using a known communications protocol (e.g., NFSv4 or SMB) to contact the second cluster at a known location (e.g., an Internet Protocol (IP) address). After operation 710, process flow 700 moves to operation 712.

Operation 712 depicts the second cluster providing data to the client computer. In some examples, operation 712 can be implemented in a similar manner as operation 704. After operation 712, process flow 700 moves to 714, where process flow 700 ends.

Figure 8:
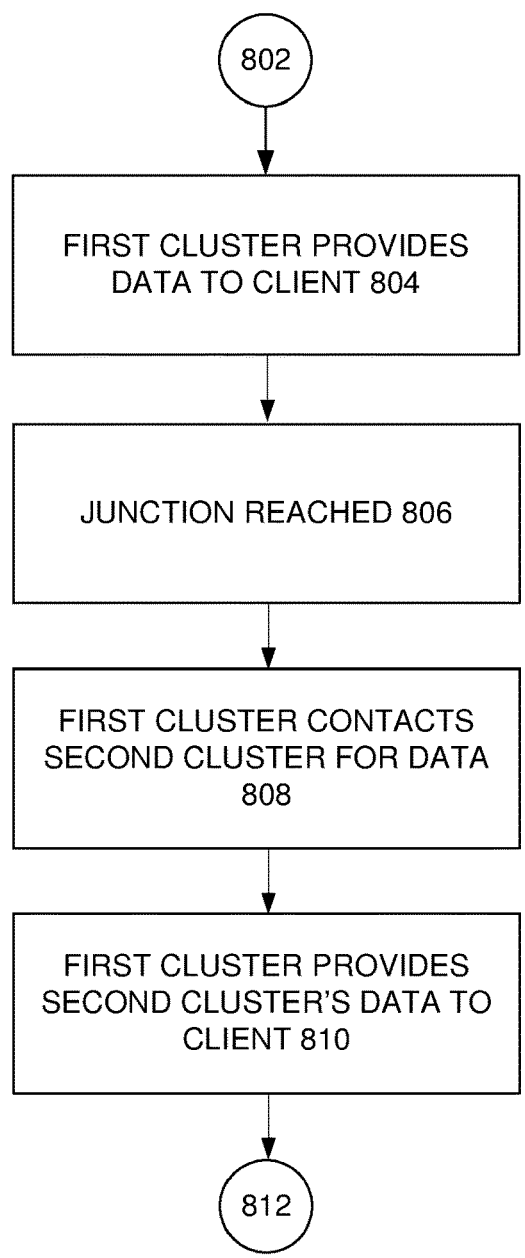
FIG. 8 illustrates an example process flow for proxying data from a cluster to a client computer, in accordance with certain embodiments of this disclosure.

FIG. 8 illustrates an example process flow 800 for proxying data from a cluster to a client computer, in accordance with certain embodiments of this disclosure. It can be appreciated that process flow 800 is an example process flow, and that there can be embodiments that implement more or fewer operations than are depicted in process flow 800, or that implement the operations of process flow 800 in a different order than is depicted in process flow 800.

In some embodiments, process flow 800 can be implemented with distributed storage system 106 of FIG. 1 as distributed storage system 106 provides data to client computer 102. Specifically, accelerator node 110 can interact with client computer 102 to effectuate process flow 700. Process flow 800 begins with 802, and then moves to operation 804.

Operation 804 depicts a first cluster providing data to a client computer. In some examples, operation 804 can be implemented in a similar manner as operation 704 of FIG. 7. After operation 804, process flow 800 moves to operation 806.

Operation 806 depicts determining that a junction has been reached. In some examples, operation 806 can be implemented in a similar manner as operation 706 of FIG. 7. After operation 806, process flow 800 moves to operation 808.

Operation 808 depicts the first cluster contacting the second cluster for data. In some examples, operation 808 can be implemented in a similar manner as operation 712 of FIG. 7. That is, rather than a client contacting a cluster using a known communications protocol at a known location, as in operation 712, here in operation 808, this can comprise the first cluster contacting the second cluster using a known communications protocol at a known location. After operation 808, process flow 800 moves to operation 810.

Operation 810 depicts the first cluster providing the second cluster's data to the client computer. That is, where the first cluster receives data from the second cluster (e.g., a file stored by in a file system of the second cluster), the first cluster can then transmit this data to the client computer, in an act of proxying. It can be appreciated that this proxying can operate in both directions—that, in addition to receiving (i.e., reading) data from the second storage cluster, the client computer can also send data (i.e., modify or create files) on the second storage cluster.

In some examples, the combination of operations 808 and 810 can comprise, in response to determining that the first client computing device is accessing second data at a junction between the first storage cluster and the second storage cluster, serving, by the computing node, as a proxy to provide third data in the first namespace to the second client computing device that is stored in the second storage cluster.

In some examples, operation 810 can comprise, in response to determining that a second client computing device is accessing the second data at the junction, referring, by the computing node, the second client computing device to access the second storage cluster.

In some examples, operation 810 comprises providing the first client computing device access to the second storage cluster, by the computing node, according to the selected approach to provide access to the second storage cluster. That is, in some examples, the selected approach can comprise proxying or referring, and here data can be proxied between the client computing device and the second cluster.

In some examples, operation 810 comprises after providing, or facilitating access by, the first client computing device access to the second storage cluster via proxying, switching, to provide, or facilitation of the access by, the first client computing device access to the second storage cluster by referring the first client computing device access to the second storage cluster. In some examples, operation 810 comprises determining to switch to the referring of the first client computing device access to the second storage cluster in response to determining that a load of the computing node or a network connection to the computing node is above a defined threshold. That is, a client can be switched from proxying to referring (and vice versa). A reason to switch from proxying to referring could be that the computing node's load has gotten too high, and referring clients is a way to lower this load.

After operation 810, process flow 800 moves to operation 712, where process flow 800 ends.

Figure 9:
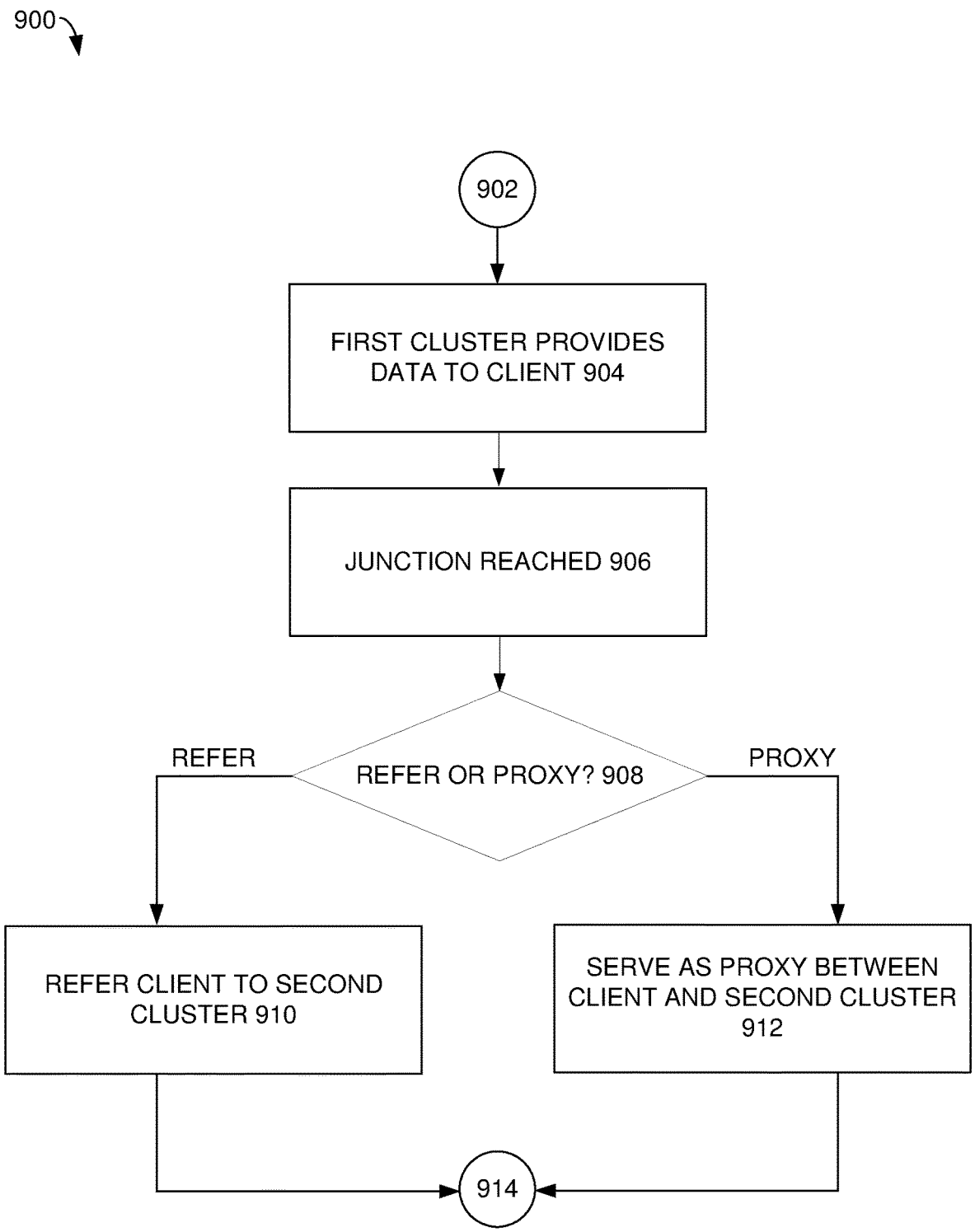
FIG. 9 illustrates an example process flow for providing data across multiple clusters in a single namespace, in accordance with certain embodiments of this disclosure.

FIG. 9 illustrates an example process flow 900 for providing data across multiple clusters in a single namespace, in accordance with certain embodiments of this disclosure. It can be appreciated that process flow 900 is an example process flow, and that there can be embodiments that implement more or fewer operations than are depicted in process flow 900, or that implement the operations of process flow 900 in a different order than is depicted in process flow 900.

In some embodiments, process flow 900 can be implemented with distributed storage system 106 of FIG. 1 as distributed storage system 106 provides data to client computer 102. Specifically, accelerator node 110 can interact with client computer 102 to effectuate process flow 700. Process flow 900 begins with 902, and then moves to operation 904.

Operation 904 depicts a first cluster providing data to a client computer. In some examples, operation 904 can be implemented in a similar manner as operation 704 of FIG. 7. After operation 904, process flow 900 moves to operation 906.

Operation 906 depicts determining that a junction has been reached. In some examples, operation 906 can be implemented in a similar manner as operation 706 of FIG. 7. After operation 906, process flow 900 moves to operation 908.

Operation 908 depicts determining whether to refer the client computer to the second cluster or to proxy data between the second cluster and the client computer. In some examples, a computing node (which can be an accelerator node, such as accelerator node 110 of FIG. 1 or accelerator node 210 of FIG. 2) can be configured to both refer a client and proxy for a client. Then, when a client reaches a junction in a federated namespace of a distributed storage system, the computing node can determine whether to refer the client or to proxy for the client.

In some examples, operation 908 comprises, in response to determining that the first client computing device is accessing second data at a junction between the first storage cluster and the second storage cluster, selecting, an approach to provide access to the second storage cluster from a set the set comprising serving as a proxy to provide the second data in the first namespace to the first client computing device that is stored in the second storage cluster, and referring the first client computing device to access the second storage cluster.

In some examples, the computing node determines to serve as the proxy for the first client computing device based on a communications protocol used for communications between the computing node and the first client computing device omitting a configuration to refer the first client computing device to access the second storage cluster. That is, a computing node can determine to proxy for a client computing device because referring is not supported by a communications protocol that the client is using to communicate with the computing node.

In some examples, the computing node determines to serve as the proxy based on an infrastructure of a data center that comprises the second storage cluster, or both of the storage clusters.

In some examples, the computing node determines to serve as the proxy for the second client computing device based on determining that the first computing device is not configured to access the second storage cluster directly. In some examples, the first computing device is not configured to access the second storage cluster directly as a result of the second storage cluster being inaccessible via a communications network that is available to the first computing device. That is, a reason to proxy can be that the client computing node cannot otherwise reach the second storage cluster. And, a reason that the client computing node cannot otherwise reach the second storage cluster can be that the second storage cluster is not accessible via a front end, or client accessible, communications network.

In some examples, the computing node determines to refer the second computing device to access the second storage cluster based on determining that referring conserves a computing resource relative to proxying for the second computing device. That is, referring may be selected over proxying because referring is determined to be more efficient according to some measure of computing resources (e.g., load on a computer, or bandwidth used).

In some examples, selecting the approach to provide access to the second storage cluster from the set is based on a status of a user account associated with the first client computing device. That is, determining whether to proxy or refer can be based on who or what the client is (e.g., an important user's connection can be prioritized without regard to computing resources consumed, and so referred or proxied based on what provides the faster or otherwise better access to data).

In some examples, the selecting the approach to provide access to the second storage cluster from the set comprise selecting the approach based on a setting made by an administrator of the computing node. That is, in some examples, determining whether to refer or proxy can be based on a storage administrator preference.

In some examples, selecting the approach to provide, or facilitate, the access to the second storage cluster from the set is performed based on at least one of a user, group, application, or data set quality of service rule associated with the first client computing device. These can generally be considered to be attributes of the client that can be used in a refer-or-proxy determination.

In some examples, selecting the approach to provide, or facilitate, the access to the second storage cluster from the set is performed based on at least one of a load of the second storage cluster, a first load of an accelerator node associated with the second storage cluster, or a second load on a computing network to which the second storage node or the accelerator node is attached to. These can generally be considered to be attributes of a distributed storage system that can be used in a refer-or-proxy determination.

Where, in operation 908, it is determined to refer the client computer to the second cluster, process flow 900 moves to operation 910. Instead, where in operation 908, it is determined to proxy data between the second cluster and the client computer, process flow 900 moves to operation 912.

Operation 910 is reached from operation 908 where it is determined in operation 908 to refer the client computer to the second cluster. Operation 910 depicts referring the client computer to the second cluster. After operation 910, process flow 900 moves to 914, where process flow 900 ends.

Operation 912 is reached from operation 908 where it is determined in operation 908 to proxy data between the second cluster and the client computer. Operation 912 depicts proxying the client computer to the second cluster. In some examples, operation 912 can be implemented in a similar manner as operations 808 and 810 of FIG. 8. After operation 910, process flow 900 moves to 914, where process flow 900 ends.

Example Operating Environments

To provide further context for various aspects of the subject specification, FIGS. 10 and 11 illustrate, respectively, a block diagram of an example distributed file storage system 1000 that employs tiered cloud storage and block diagram of a computer 1102 operable to execute the disclosed storage architecture in accordance with aspects described herein. For example, aspects of distributed storage system 1000 and computer 1102 can be used to implement cluster 108a and cluster 108b of FIG. 1, and aspects of computer 1102 can be used to implement client computer 1012, distributed storage system 106, accelerator node 110, and storage node 112 of FIG. 1.

Referring now to FIG. 10, there is illustrated an example local storage system including cloud tiering components and a cloud storage location in accordance with implementations of this disclosure. Client device 1002 can access local storage system 1090. Local storage system 1090 can be a node and cluster storage system such as an EMC Isilon Cluster that operates under OneFS operating system. Local storage system 1090 can also store the local cache 1092 for access by other components. It can be appreciated that the systems and methods described herein can run in tandem with other local storage systems as well.

As more fully described below with respect to redirect component 1010, redirect component 1010 can intercept operations directed to stub files. Cloud block management component 1020, garbage collection component 1030, and caching component 1040 may also be in communication with local storage system 1090 directly as depicted in FIG. 10 or through redirect component 1010. A client administrator component 1004 can use an interface to access the policy component 1050 and the account management component 1060 for operations as more fully described below with respect to these components. Data transformation component 1070 can operate to provide encryption and compression to files tiered to cloud storage. Cloud adapter component 1080 can be in communication with cloud storage 1 and cloud storage N, where N is a positive integer. It can be appreciated that multiple cloud storage locations can be used for storage including multiple accounts within a single cloud storage location as more fully described in implementations of this disclosure. Further, a backup/restore component 1097 can be utilized to back up the files stored within the local storage system 1090.

Cloud block management component 1020 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete Mode and extended attributes of the file, can be still stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 1020 in chunks of data. A uniform chunk size can be selected where all files that tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 1060 manages the information for cloud storage accounts. Account information can be populated manually via a user interface provided to a user or administer of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 1020 based on list of mappings it manages. For example, each stub can be associated with an account, and the cloud block management component 1020 can aggregate information from a set of stubs associated with the same account. Other example statistics that can be maintained include the number of recalls, the number of writes, the number of modifications, the largest recall by read and write operations, etc. In one implementation, multiple accounts can exist for a single cloud service provider, each with unique account names and access codes.

The cloud adapter component 1080 manages the sending and receiving of data to and from the cloud service providers. The cloud adapter component 1080 can utilize a set of APIs. For example, each cloud service provider may have provider specific API to interact with the provider.

A policy component 1050 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 1030. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 1030 can be used to determine which files/objects/data constructs remaining in both local storage and cloud storage can be deleted. In one implementation, the resources to be managed for garbage collection include cloud metadata objects (CMOs), cloud data objects (CDOs) (e.g., a cloud object containing the actual tiered content data), local cache data, and cache state information.

A caching component 1040 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 1020, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 1040 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data can be represented by clear, adding existing file information to the cache can be represented by fill, adding new information to the cache by write, reading information from the cache can be represented by read following a fill, updating existing file information to the cache can be represented by fill followed by a write, and truncating cache due to file operation can be represented by sync and then a partial clear.

In one implementation, the caching component 1040 can track any operations performed on the cache. For example, any operation touching the cache can be added to a queue prior to the corresponding operation being performed on the cache. For example, before a fill operation, an entry can be placed on an invalidate queue as the file and/or regions of the file will be transitioning from an uncached state to cached state. In another example, before a write operation, an entry can be placed on a synchronization list as the file and/or regions of the file will be transitioning from cached to cached-dirty. A flag can be associated with the file and/or regions of the file to show that it has been placed in a queue, and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be requeued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream (ADS). It can be appreciated that ADS can be based on the New Technology File System (NTFS) ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tacking tree can be used to verify that the cache state for the cache region is not "not cached;" (4) data can be read from the cache region; (5) the shared lock on the cache region can be deactivated; and (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached," the region can be filled; (7) the cache tracking tree can be updated to mark the cache region as dirty; (8) the data can be written to the cache region; and (9) the lock can be deactivated.

In one implementation, data can be cached at the time of a first read. For example, if the state associated with the data range called for in a read operation is non-cached, then this can be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 1070 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the backup/restore component 1097 can transfer a copy of the files within the local storage system 1090 to another cluster (e.g., target cluster). Further, the backup/restore component 1097 can manage synchronization between the local storage system 1090 and the other cluster, such that, the other cluster is timely updated with new and/or modified content within the local storage system 1090.

FIG. 11 illustrates a block diagram of a computer 1102 operable to execute the disclosed communication architecture. To provide additional context for various aspects of the disclosed subject matter, FIG. 11 and the following discussion are intended to provide a brief, general description of a suitable computing environment 1100 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read-only memory (ROM), electrically erasable programmable read-only memory (EEPROM), flash memory or other memory technology, compact disc read only memory (CD-ROM), digital versatile disc (DVD; sometimes referred to as digital video disc) or other optical disc storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals can refer to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 11, the example environment 1100 for implementing various aspects of the specification includes a computer 1102, the computer 1102 including a processing unit 1104, a system memory 1106 and a system bus 1108. As an example, the component(s), server(s), node(s), cluster(s), system(s), and/or device(s) disclosed herein can each include at least a portion of the computer 1102. The system bus 1108 can couple system components including, but not limited to, the system memory 1106 to the processing unit 1104. The processing unit 1104 can be any of various commercially-available or custom processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 can include ROM 1110 and RAM 1112. A basic input/output system (BIOS) can be stored in a non-volatile memory 1110 such as ROM, erasable programmable read-only memory (EPROM), EEPROM, where the BIOS can contain the basic routines that help to transfer information between elements within the computer 1102, such as during startup. The RAM 1112 can also include a high-speed RAM such as static RAM for caching data, or NVRAM.

The computer 1102 further includes an internal hard disk drive (HDD) 1114, which internal hard disk drive 1114 can also be configured for external use in a suitable chassis (not shown), a magnetic floppy disk drive (FDD) 1116, (e.g., to read from or write to a removable diskette 1118) and an optical disc drive 1120, (e.g., reading a CD-ROM disc 1122 or, to read from or write to other high capacity optical media such as the DVD). The hard disk drive 1114, magnetic disk drive 1116 and optical disc drive 1120 can be connected to the system bus 1108 by a hard disk drive interface 1124, a magnetic disk drive interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the subject disclosure.

The drives and their associated computer-readable storage media can provide nonvolatile storage of data, data structures, computer-executable instructions, and so forth. For the computer 1102, the drives and storage media can accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

Many program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the specification can be implemented with various commercially available operating systems or combinations of operating systems.

A user can enter commands and information into the computer 1102 through one or more wired or wireless input devices, e.g., a keyboard 1138 and/or a pointing device, such as a mouse 1140 or a touch screen or touchpad (not illustrated). These and other input devices can be connected to the processing unit 1104 through an input device interface 1142 that is coupled to the system bus 1108, but can be connected by other interfaces, such as a parallel port, an IEEE 1394 port, a game port, a USB port, an infrared (IR) interface, etc. A monitor 1144 or other type of display device can also be connected to the system bus 1108 via an interface, such as a video adapter 1146.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and can include many or all the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments can be commonplace in offices and companies, and facilitate enterprise-wide computer networks, such as intranets, all of which can connect to a global communications network, e.g., the Internet.

When used in a LAN networking environment, the computer 1102 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, can be connected to the system bus 1108 via the serial port interface 1142. In a networked environment, program modules depicted relative to the computer 1102, or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., desktop and/or portable computer, server, communications satellite, etc. This includes at least Wireless Fidelity (Wi-Fi) and BLUETOOTH wireless technologies. Thus, the communication can be a predefined structure as with a conventional network or simply an ad hoc communication between at least two devices.

Wi-Fi can allow a connection to the Internet from a couch at home, a bed in a hotel room, or a conference room at work, without wires. Wi-Fi can be a wireless technology similar to that used in a cell phone that enables such devices, e.g., computers, to send and receive data indoors and out; anywhere within the range of a base station. Wi-Fi networks can use radio technologies called IEEE 802.11 (a, b, g, n, etc.) to provide secure, reliable, fast wireless connectivity. A Wi-Fi network can be used to connect computers to each other, to the Internet, and to wired networks (which can use an IEEE 802.3 standard or Ethernet). Wi-Fi networks can operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        providing, by a computing node of the system that is a member of a first storage cluster and of a second storage cluster, first data in a first namespace to a first client computing device that is stored in the first storage cluster;
        in response to determining that the first client computing device is accessing second data at a junction between the first storage cluster and the second storage cluster, serving, by the computing node, as a proxy to provide third data in the first namespace to the second client computing device that is stored in the second storage cluster; and
        in response to determining that a second client computing device is accessing the second data at the junction, referring, by the computing node, the second client computing device to access the second storage cluster.

2. The system of claim 1, wherein the computing node is configured to serve as the proxy to the first client computing device, and is configured to refer the first client computing device to access the second storage cluster.

3. The system of claim 1, wherein the computing node determines to serve as the proxy for the first client computing device based on a communications protocol used for communications between the computing node and the first client computing device omitting a configuration to refer the first client computing device to access the second storage cluster.

4. The system of claim 1, wherein the operations further comprise:
    determining, by the computing node, to serve as the proxy based on an infrastructure of a data center that comprises the second storage cluster.

5. The system of claim 1, wherein the operations further comprise:
    determining, by the computing node, to refer the second computing device to access the second storage cluster based on determining that referring conserves a computing resource relative to proxying for the second computing device.

6. The system of claim 1, wherein the computing node determines to serve as the proxy for the second client computing device based on determining that the first computing device is not configured to access the second storage cluster directly.

7. The system of claim 6, wherein the first computing device is not configured to access the second storage cluster directly as a result of the second storage cluster being inaccessible via a communications network that is available to the first computing device.

8. A method, comprising:
    sending, by a computing node comprising a processor and that is a member of a first storage cluster and of a second storage cluster, first data in a first namespace to a first client computing device that is stored in the first storage cluster;
    in response to determining that the first client computing device is accessing second data at a junction between the first storage cluster and the second storage cluster, selecting, by the computing node, an approach to provide access to the second storage cluster from a set of approaches, the set of approaches comprising serving as a proxy to provide the second data in the first namespace to the first client computing device that is stored in the second storage cluster, and referring the first client computing device to access the second storage cluster, wherein the selecting results in a selected approach; and
    enabling, by the computing node, the first client computing device to access the second storage cluster according to the selected approach to enable access to the second storage cluster.

9. The method of claim 8, wherein the selecting the approach to enable the access to the second storage cluster from the set of approaches is based on a status of a user account associated with the first client computing device.

10. The method of claim 8, wherein the selecting the approach to enable the access to the second storage cluster from the set of approaches comprises:
    selecting the approach based on a setting received as input from an administrator of the computing node.

11. The method of claim 8, wherein the junction comprises information about the second storage cluster.

12. The method of claim 8, wherein the junction appears to the first client computing device as a directory in a file system of the first namespace.

13. The method of claim 8, further comprising:
after facilitating access by the first client computing device to the second storage cluster via proxying, switching, by the computing node, to facilitation of the access by the first client computing device to the second storage cluster by referring the first client computing device access to the second storage cluster.

14. The method of claim 13, further comprising:
determining to switch, by the computing node, to the referring of the first client computing device access to the second storage cluster in response to determining that a load of the computing node or a network connection to the computing node is above a defined threshold.

15. A non-transitory computer-readable medium comprising instructions that, in response to execution, cause a computing node of a system and comprising a processor to perform operations, comprising:
in response to determining that a first client computing device is accessing first data in a first namespace at a junction between a first storage cluster and a second storage cluster, selecting an approach to provide access to the second storage cluster from a set of approaches, the set comprising serving as a proxy to the first client computing device to access second data that is stored in the second storage cluster, and referring the first client computing device to access the second storage cluster; and
facilitating access by the first client computing device to the second storage cluster according to the approach to facilitate the access to the second storage cluster.

16. The non-transitory computer-readable medium of claim 15, wherein the computing node is configured to participate as a node that can read and write data for each of the first storage cluster and the second storage cluster, and to terminate a client protocol connection for each of the first storage cluster and the second storage cluster.

17. The non-transitory computer-readable medium of claim 15, wherein the operations further comprise:
after facilitating the access by the first client computing device to the second storage cluster via referring the first client computing device access to the second storage cluster, switching to facilitate the access by the first client computing device to the second storage cluster by proxying.

18. The non-transitory computer-readable medium of claim 15, wherein the computing node presents the first namespace to the first client computing device by aggregating a first access zone of the first storage cluster and a second access zone of the second access cluster into the first namespace.

19. The non-transitory computer-readable medium of claim 15, wherein the selecting the approach to facilitate the access to the second storage cluster from the set is performed based on at least one of a user, group, application, or data set quality of service rule associated with the first client computing device.

20. The non-transitory computer-readable medium of claim 15, wherein the selecting the approach to facilitate the access to the second storage cluster from the set is performed based on at least one of a load of the second storage cluster, a first load of an accelerator node associated with the second storage cluster, or a second load on a computing network to which the second storage node or the accelerator node is attached.

* * * * *